R. A. CAMPBELL.
TIRE STEM COVER.
APPLICATION FILED OCT. 2, 1914.

1,184,820.

Patented May 30, 1916.

WITNESSES

INVENTOR
ROBERT A. CAMPBELL
BY
ATTORNEY

UNITED STATES PATENT OFFICE.

ROBERT A. CAMPBELL, OF MINNEAPOLIS, MINNESOTA.

TIRE-STEM COVER.

1,184,820.  Specification of Letters Patent.  Patented May 30, 1916.

Application filed October 2, 1914. Serial No. 864,657.

*To all whom it may concern:*

Be it known that I, ROBERT A. CAMPBELL, a citizen of the United States, resident of Minneapolis, county of Hennepin, State of Minnesota, have invented certain new and useful Improvements in Tire-Stem Covers, of which the following is a specification.

The object of my invention is to provide an attachment for a pneumatic tire stem, which will enable the user to easily and quickly uncover the end of the tire stem for ascertaining the air pressure within the tire with a gage, or for increasing such pressure, and as easily and quickly recover the tire stem.

A further object is to provide an air-tight cover for the end of the tire stem that contains nothing that can touch the valve stem to release the air in the tire.

A further object is to provide a simple inexpensive apparatus, adapted to being adjusted to fit any type, size or length of tire stem in ordinary use.

Other objects of the invention will appear from the following detailed description.

The invention consists generally in various constructions and combinations, all as hereinafter described and particularly pointed out in the claims.

Figure 1:
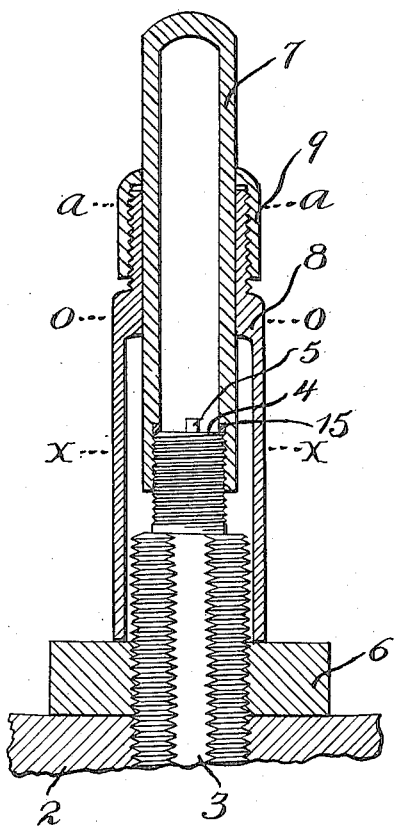
Figure 2:
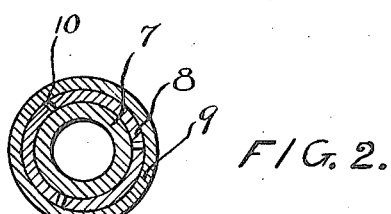
Figure 3:
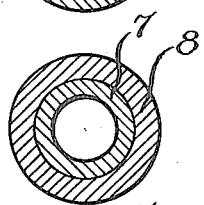
Figure 4:
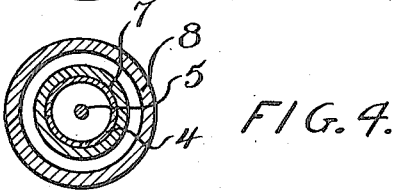

In the accompanying drawings forming part of this specification, Figure 1 is a detailed sectional view of a tire stem and cover therefor. Fig. 2 is a sectional view on the line a—a. Fig. 3 is a sectional view on the line o—o. Fig. 4 is a sectional view on the line x—x.

In the drawing, 2 represents the wheel rim and 3 a tire stem, exteriorly threaded as usual in stems of this kind. From the end of the tire stem, valve stem 5 protrudes. A rim nut 6 is interiorly threaded to engage the threads of the stem 3, and has a bearing on the wheel rim.

An elongated cap 7 is interiorly threaded to engage the threads on the outside of the tire stem, and is provided with an interior shoulder and a lead gasket 15, for making an air-tight joint with the end of the tire stem.

Having a bearing upon the exterior surface of the cap 7 is a tube 8 open at both ends. At its upper end are vertical slots 10, between these slots the segments of the tube are threaded externally, the threads extending downward a short distance below the lower ends of the slots. These segments form the jaws of a chuck. The nose 9 of the chuck is threaded internally to force the jaws to grasp and retain the cap 7, when the nose is screwed into place. The chuck is designed to retain tube 8 on cap 7 at the desired location, so that the lower end of tube 8 will have a bearing on the rim nut 6 when cap 7 is screwed onto the tire stem. In this way a covering is made of the entire tire stem, dust and moisture-proof, and the end of the tire stem is made air-tight.

Various forms, modifications, and adaptations of this design may be made, and come within the scope of this invention, as for example, the outer surface of the cap 7, and inner and outer surfaces of the tube 8 may be of hexagonal or other shape, or the nose 9 of the chuck, and outer surface of the tube 8 may be provided with means for giving a suitable hand or tool grip.

The utility of the invention consists in the saving in time and labor in removing and replacing the tire stem covers, and its adaptability to adjustment to fit different lengths of protrusion of tire stems from wheel rims.

The utility of the invention consists further in the absence of any part contained in the device that may touch the valve stem.

I claim as my invention:

1. The combination with a tire stem, of a valve cap threaded to engage threads on the tire stem, a dust cover, and a collar open at both ends surrounding said dust cover, said collar when operated actuating means for securing said valve cap and said dust cover in frictional engagement for the purpose of applying and removing said dust cover and said valve cap to and from the tire stem as one piece, and for the purpose of adjusting said dust cover on said valve cap at a desired location.

2. The combination with a tire stem, of a valve cap, a dust cover, a collar open at both ends surrounding said dust cover and means actuated by the operation of said collar for locking said valve cap and said dust cover together, for the purpose specified.

3. The combination with a tire stem, of a valve cap, a dust cover having threaded beveled segments at its upper end, and a collar open at both ends beveled and threaded to fit said segments and when operated securing a frictional engagement between said segments and said valve cap for the purpose specified.

4. The combination with a tire stem, of a valve cap, a dust cover, a member having a bearing on said dust cover, and means actuated by the operation of said member for locking said dust cover and said valve cap together for the purpose specified.

5. The combination with a tire stem, of a member having means for attachment to the tire stem, a second member designed to act as a dust guard, a third member open at both ends having a bearing on said second member, and means actuated by the operation of said third member to secure an engagement between said first member and said second member, said engagement being designed to prevent movement of one of the first mentioned two members independent of the other of the first mentioned two members.

6. The combination with a tire stem, of a dust cover having longitudinal slots at one end, the segments between said slots being beveled and threaded externally, a collar open at both ends surrounding the said end of said dust cover, said collar being beveled and threaded internally to fit the said segments, said collar and said segments being designed so that when said collar is operated said segments will bend inward and reduce the opening in the end of said dust cover.

ROBERT A. CAMPBELL.

Witnesses:
AMANDA E. HENDRICKSON,
J. A. HEIDBRINK.